Nov. 30, 1943.　　　H. S. BRADY　　　2,335,386
GLASS FEEDING
Filed Aug. 26, 1941　　　4 Sheets-Sheet 1
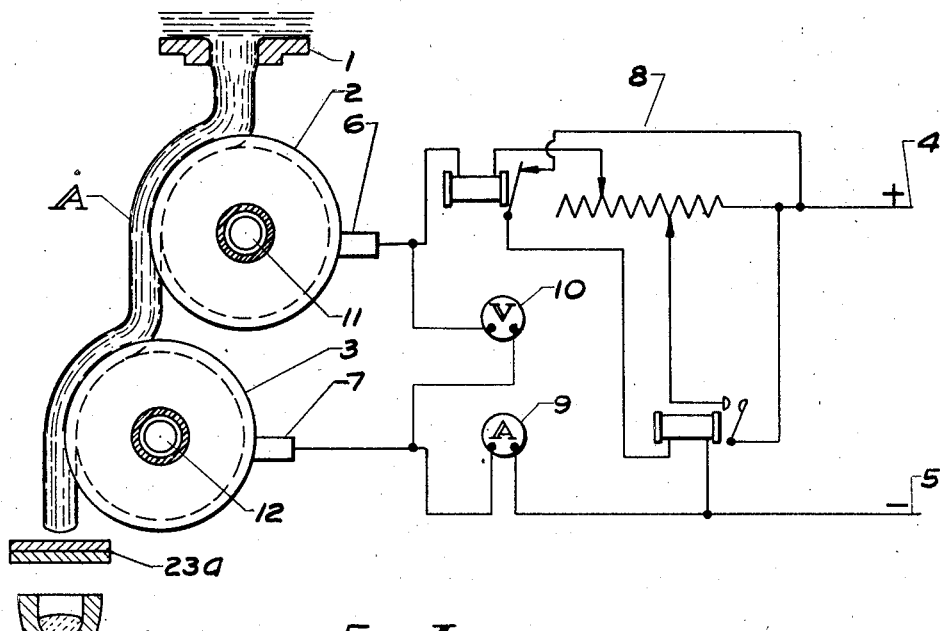
FIG. I
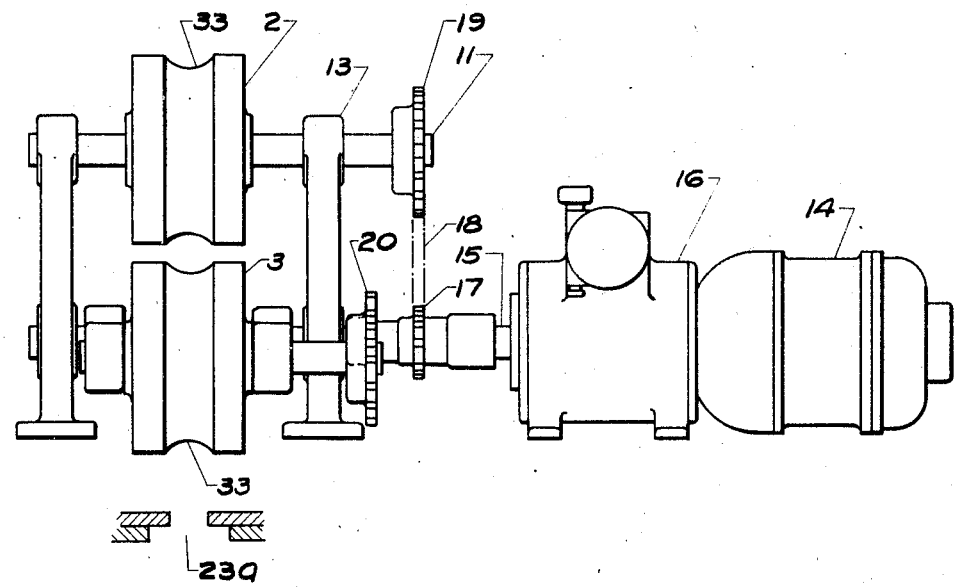
FIG. II
INVENTOR.
Hugh S. Brady
BY William B. Wharton
ATTORNEY.

Nov. 30, 1943.   H. S. BRADY   2,335,386
GLASS FEEDING
Filed Aug. 26, 1941   4 Sheets-Sheet 2
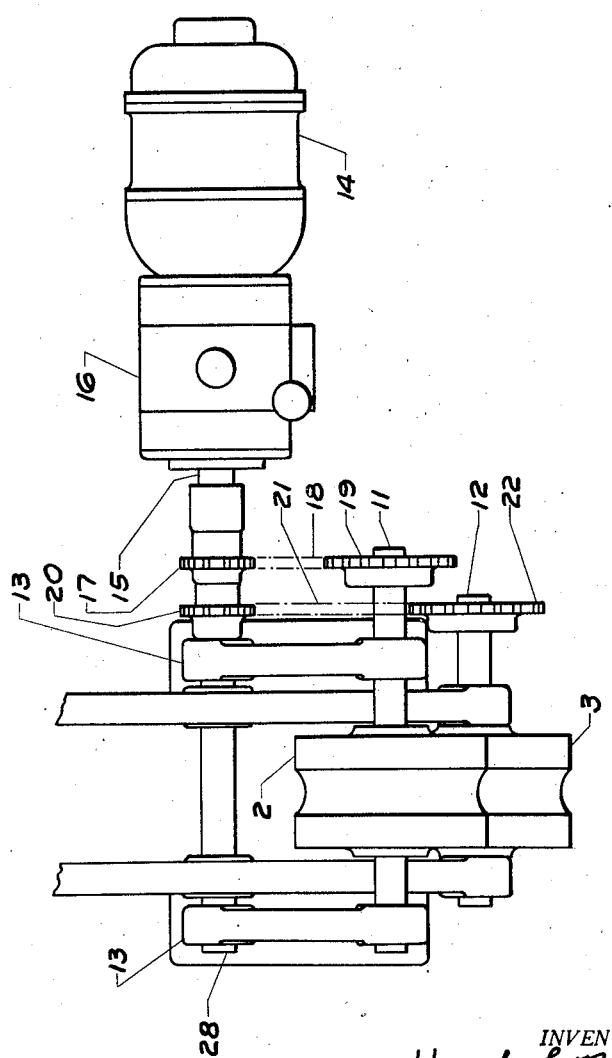
FIG. III
INVENTOR.
Hugh S. Brady
BY William B. Wharton
ATTORNEY Nov. 30, 1943.  H. S. BRADY  2,335,386
GLASS FEEDING
Filed Aug. 26, 1941  4 Sheets-Sheet 3
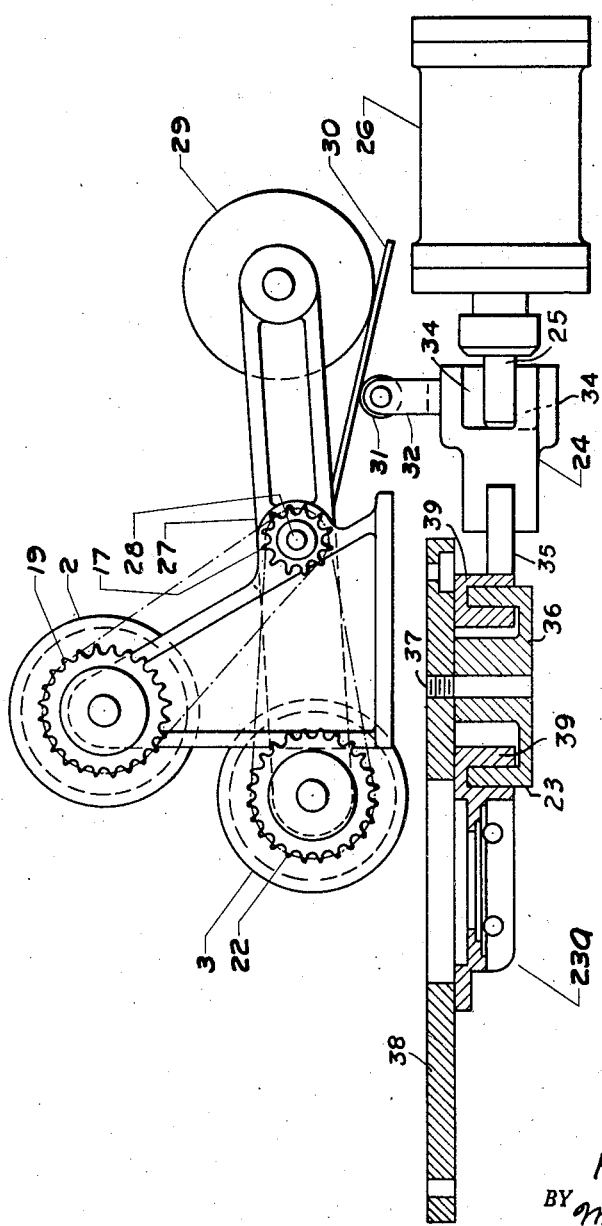
INVENTOR.
Hugh S. Brady
BY William B. Whatlen
ATTORNEY

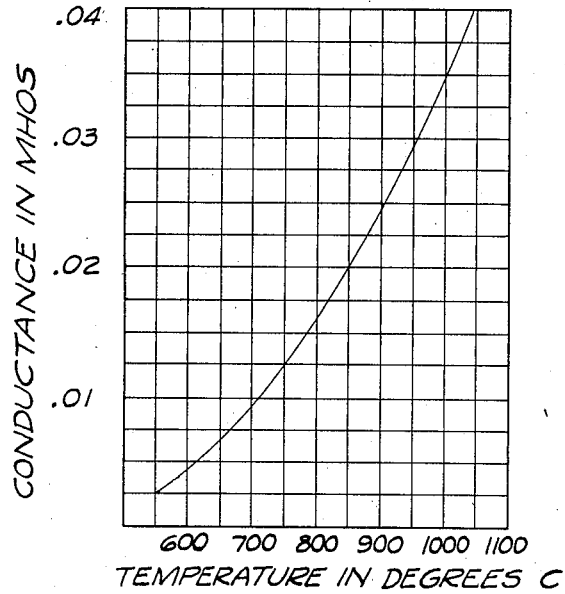
Fig. V
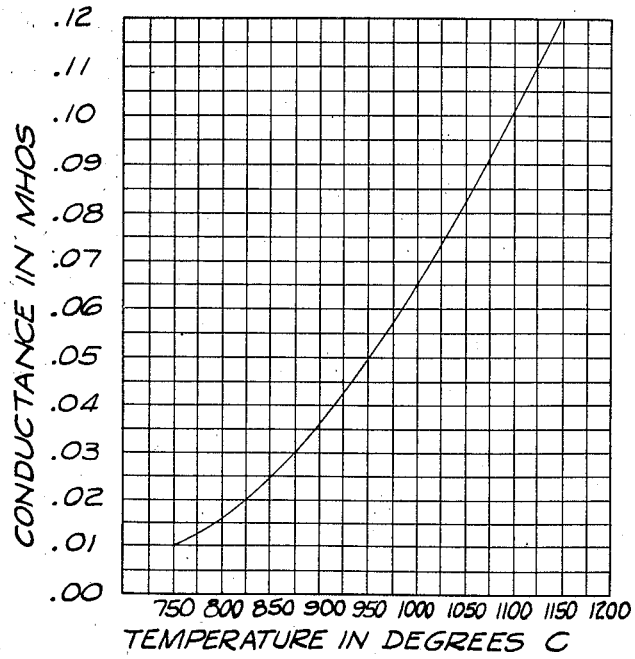
Fig. VI

Patented Nov. 30, 1943

2,335,386

UNITED STATES PATENT OFFICE 2,335,386

GLASS FEEDING

Hugh S. Brady, Greensburg, Pa., assignor to The Jeannette Glass Company, Jeannette, Pa., a corporation of Pennsylvania Application August 26, 1941, Serial No. 408,332

7 Claims. (Cl. 49—55)

This invention relates to a method of feeding glass to forming mechanism in which it is pressed, blown, or pressed and blown into finished articles.

As is well recognized in the art fundamental problems exist in the formation and delivery of molten glass in mold charges which are to be formed into glass articles in a forming machine. It is generally recognized that the less contact glass outflowing from a furnace has with shaping or delivering instrumentalities, on its way to the mold, the freer will the glass be of chill spots, shear marks, and similar imperfections. It is also recognized in the art, however, that the procedure of suspending the outflow from the furnace and severing a body of the outflow from the main body of the glass to drop directly into a mold also falls short of perfection. In this latter procedure the severed body of glass tends to be overly elongate in spite of efforts to increase its thickness at the expense of its length, which is known in the art as "stuffing." It is only within very rough approximation that the mold charges severed from the main body of glass in the furnace possess the proper shape to be pressed or blown in the forming machine with the least violence to the physical structure of the glass.

It is my object to provide a method of and apparatus for feeding mold charges of glass from a furnace to a forming machine which possesses all the advantages attendant upon the direct delivery of a severed mold charge to the forming machine, and all the advantages attendant upon methods of pre-shaping the mold charges during their passage from the furnace to the forming machine, without the disadvantages previously attendant upon either of those feeding methods.

In accordance with my invention I make use of the previously known, but little understood, fact that at certain temperatures bodies of glass of proper composition have sufficient electrical conductivity for the passage of an electrical current through them, so that the resistance of the glass body to the passage of the current exerts a heating effect of substantial value in the body of glass. Utilizing this principle, I am able freely to contact molten glass in its passage from a heating furnace, or tank, to a forming machine to impose upon a flowing stream of the glass such dimensions and contour as may be desirable for delivery into the mold, and may sever mold charges from this flowing stream or elongate body of glass at a point closely adjacent the mold of the forming machine into which it is to be received.

In its broadest sense, my invention sounds wholly in method, regardless of the instrumentalities by means of which the method steps are performed. In its more specific sense, my invention sounds additionally in apparatus in that I have invented apparatus peculiarly adapted simply and effectively to perform the functions of my method.

Broadly to state my invention in terms of method, I work with a stream of glass flowing unobstructedly or with but little obstruction to its outflow from the outlet orifices of a glass heating furnace or tank. Adjacent the point in the forming machine at which mold charges are delivered, I sever them from the stream flowing from the outlet orifices of the furnace to that point. Between the point of outflow and the point of severance, I control the shape and movement of the stream, so that it does not twist or string-out, or become in any way undesirably deformed up to the point of its severance. In effecting this delivery of the glass, the glass is supportingly contacted by bodies which so control and guide it, that the above-indicated results are obtained. This stream of glass I usually subject to the passage of an electric current, the heating effect of which maintains it at optimum molding or blowing temperature, and delivers it without general or regional chilling to the forming instrumentalities. Desirably, in so doing, I use as the electrodes by means of which electric current is passed through the stream of glass, the same bodies or instrumentalities which are useful in directing and supporting the stream during its flow to the point of severance.

I may here initially note the function of temperature in conducting the method of my invention. Glass being a typical non-conductor of electricity, and having when molten limited conductivity, by virtue of its elevated temperature, it is not necessary from the electrical viewpoint to place an upper limit upon the initial temperature of the glass (through which I pass an electric current) as it flows from the furnace. In obtaining the benefit of this function, it is necessary only that the temperature of the glass be sufficiently high initially that the glass provides a current path sufficiently conductive for the passage of the current. The resistance coefficient is in all cases fully adequate if the conductivity of the glass is sufficient to permit the passage of current under a potential of but reasonable value. In other words, it is not necessary to limit the conductivity of the glass in order to retain high resistance value, but merely to assure the passage of current in order to obtain a high heating effect by the inherent resistance of the glass. The above being the case, and it being in my method unnecessary to suspend a mold charge of glass for severance, I am able to operate with the outflow glass at as high a temperature as has previously been considered good practice, and can deliver mold charges of the glass to the mold at the same temperature or at a temperature slightly lower or slightly higher than the outflow of the glass as the circumstances of the molding or blowing operation may render desirable. Within reasonable limits, the delivery temperature of the mold charges is thus independent of the initial temperature of the glass as it issues from the furnace.

In the accompanying drawings the apparatus there shown is in principle to be considered as preferred apparatus for attaining the objects of my invention, and in structure is to be considered as exemplary of apparatus suitable for conducting my method.

In the accompanying drawings:

Fig. I is a wiring diagram and schematic representation of an apparatus embodiment of means constituting and for effecting my invention.

Fig. II is a front elevational view structural in character, showing apparatus of the sort indicated more generally in Fig. I.

Fig. III is a plan view of the apparatus.

Fig. IV is a side elevation of the apparatus shown in Figs. II and III.

Fig. V is a chart plotting a curve taken from the literature, and showing the conductivity temperature relations in reciprocal ohms for a glass of particular composition.

Fig. VI is a chart plotting the conductivity temperature relation in conductivity units of a glass of different composition from that of the glass, the relations of which are plotted in Fig. V.

Referring initially to the wiring diagram and schematic representation of Fig. I, reference numeral 1 designates the outflow orifice of a glass melting furnace from which a stream of glass A is shown as issuing. Closely adjacent the outflow orifice of the furnace, the stream of glass A impinges upon the surface of a roller 2, rotating in the direction of the stream-flow, and is deflected by contact with that roller. The flowing stream of glass then comes into contact with the surface of a second roller 3, which is spaced vertically from the upper roller 2 and is offset outwardly therefrom. Similarly to roller 2, this lower roller 3 is rotated in the direction of the stream-flow of the glass. Below the lower roller 3, and desirably close to that roller successive mold charges are severed from the stream of glass.

In this organization such electrical connections are made that roller 2 is the anode and roller 3 the cathode of an electrical circuit, completed through the flowing stream of glass A. The diagram shows coductors 4 and 5, which lead from a suitable source of (preferably direct) current, and which are in electrical contact with the rollers A and B by means of contact brushes 6 and 7 respectively. Interposed in the circuit there is a voltage regulator 8 which is organized to maintain a current value controlled by the resistance and conversely by the conductance of the glass; so that the temperature of the glass indirectly controls the current, and the temperature of the glass is maintained at a constant level. In the circuit there is also an ammeter 9 and a volt meter 10 to make observable the electrical conditions in the circuit through the rollers and the stream of glass.

The conductivity of molten glass as a general fact and with relation to the composition of the glass has been recognized in the literature. While literature references to the electrical conductivity of glass are numerous, most of them relate solely to conductivity from the viewpoint of electrical insulation. The most pertinent literature on the subject which I have found consists of the book "The Properties of Glass" by George W. Morey, published by Reinhold Publishing Company, New York, 1938, with particular reference to chapter 17 of that book; and the Journal of the Society of Glass Technology, commonly referred to as the "English Society of Glass Technology," and specifically volume XXIII of the Journal with particular reference to section 99, pages 268 to 288, section 98, pages 197 to 238 of that volume. In that volume of the Journal other information which I have found useful is developed. Thus Bryson in the Proceedings of the Society of Glass Technology, volume XXIII (Birmingham, England, 1927) on page 331, plots a curve showing the conductivity relation to temperature for a glass composed in accordance with the formula,

| | |
|---|---|
| $SiO_2$ | 75.90 |
| $Na_2O$ | 15.38 |
| $CaO$ | .5 |
| $MgO$ | 6.00 |
| $Al_2O$ | 1.27 |

It will be noted in the chart of Fig. V that the increase in the conductivity of the glass as expressed in reciprocal ohms increases progressively with increased temperature so far as the curve is plotted, the conductivity being, for example, 125 reciprocal ohms at a temperature of 750° C. and 350 reciprocal ohms at a temperature of 1000° C. Bryson makes the observation that with glass of this formula the increase in the conductance of the glass proceeds in accordance with the general formula $T = 100 \times 10^{-10}$, T being the temperature of the glass in degrees centigrade.

It is currently my understanding, based initially on the investigations of Bryson, that the speed of the sodium ion in the glass has a definitely favorable effect in rendering molten glass conductive; the theory being that increased temperature of the glass tends to increase the speed of this ion, with resultant increase in the conductivity of the glass. It is also a fact that the presence of barium in the glass has a favorable effect on the conductivity of the glass. It is probable that other elements exert a similarly favorable influence on the conductivity of the glass, and I do not intend to limit the scope of my method to glass having a sodium, barium, and sodium-barium content, or a content of any other specific element or elements. I have found in practice that a content of sodium and of barium, particularly the former, increases the conductivity of the glass at elevated temperatures.

My invention thus fundamentally consists in taking practical advantage of a fact which has heretofore existed merely as a scientific observation in regard to the possession by molten glass of conductivity sufficient to produce heat by its resistance to the passage of an electrical current.

Practical work previously done in connection with the conductivity of glass has been from the opposite viewpoint, since glass is a typical insulator and its resistance has been considered from the viewpoint of total resistance to the passage of electrical current.

Fig. VI of the drawings plots a curve analogous to the curve of Bryson, giving the relation in reciprocal ohms of the conductivity of a glass having a specifically useful composition with respect to its conductivity and a resultant possibility of maintaining it at high temperature by the passage of an electrical current. The specific formula for the glass, the conductivity temperature curve of which is plotted in Fig. VI, is as follows:

| | |
|---|---|
| $SiO_2$ | 75.6 |
| $Na_2O$ | 15.5 |
| CaO | 3.4 |
| MgO | 2.6 |
| $Al_2O$ | 1.6 |
| BaO | 1.2 |

It will be noted that in the foregoing formula the glass has a substantial content of sodium, namely a content of 15.5% and a substantial content of barium, namely 1.2%.

I have discovered in practice that if the content of elements favorable to conductivity in the glass be reduced, compensation may at least in part be had by increasing the voltage of the current passing to the circuit which includes the molten glass. With an increased content of elements favorable to conductivity, it is possible to maintain the temperature of the glass with current of somewhat reduced voltage.

To give a typical example of a precedure in accordance with my method, the stream of glass issuing from the furnace may be considered to have an initial temperature of about 1050° C., and is at approximately that temperature upon coming into contact with the upper roller 2. The chilling effect resulting from contact with the roller 2 is fully compensated by the passage through the glass of a current having a potential of about 250 volts. Upon contacting the lower roller 3, the glass is at a temperature of about 1000° C., and since the stream of glass is subjected to the current at its point of contact with the lower roller 3 it is at substantially that temperature when acted upon by shears placed below the lower roller 3 to sever it into mold charges for immediate reception by the molds into which it is delivered.

The foregoing describes my invention in terms of relatively pure method and on the basis of the diagrammatic representation of apparatus and electrical circuit, and the charts which have been considered above. Referring now particularly to exemplary apparatus of a preferred sort, attention is directed to Figs. II, III and IV of the drawings. In these drawings the vertically spaced and horizontally offset rollers 2 and 3, which are of suitable conductive metal, such as aluminum, or some suitable conductive alloy of aluminum, copper, nickel and other electrically-conductive and non-corrosive metals, are mounted respectively on shafts 11 and 12 rotatable in standards 13. The rollers receive power for their rotation from a motor 14 delivered from shaft 15 connected with the motor by way of speed reducing gearing in gear box 16. Shaft 15 carries a sprocket 17 connected by sprocket chain 18 with a sprocket 19 on the shaft 11 of roller 2. Motor shaft 15 also carries a sprocket 20 connected by sprocket chain 21 with a sprocket 22 on the shaft 12 of the roller 3. The rollers desirably may be insulated by surrounding the shafts 11 and 12 by which they are trunnioned in the standards 13 with insulation, and by mounting the brushes 6 and 7 which connect them in the circuit to contact the ends of the rollers.

A serious problem in severing mold charges from a stream of glass results from the tendency of the glass-cutting shears to become heated by continuous contact with the glass, and I, therefore, prefer to use means, such as those shown as forming part of my exemplary apparatus, which raise the stream of glass out of contact with the shears immediately after each shearing operation. Referring particularly to Fig. IV of the drawings the glass-cutting shears, which are primarily of the standard form commonly used in the industry in connection with automatic feeders, are designated generally by reference numeral 23. As is usual the blades 23a of the shears are opened and closed by suitable operating connections well known in the art, which are indicated generally by reference numeral 24, and which are acted upon by the piston rod 25 of a fluid pressure cylinder 26 in synchronism with the movements of a suitable mold-carrying instrumentality, which presents molds and forming means for the reception of severed mold charges. The shear organization is conventional, being primarily of the sort shown in United States Patent No. 1,080,742 to Romeo Williamson, in United States Patent No. 1,866,506 to William J. Miller, and in United States Patent No. 1,942,035 to William J. Miller and Edward A. Lawrence. That is, in conventional manner the shear blades 23a are operated by advancement and retraction of piston rod 25 through a reciprocable yoke element 24 mounted to reciprocate with the piston rod, links 34, and links 35, one of which is shown in Fig. IV. A drum 36 is mounted by pin 37 on a shear-plate 38. In drum 36 are the bases 39 of the shear blades, one such base being shown as a continuation of the single shear blade shown in Fig. IV. By the toggle formed of links 34 and 35, reciprocating movement of piston rod 25 and yoke 24 reciprocating with it is transformed into swinging movement of the shear blades. I utilize the reciprocating piston movement for a novel purpose, as immediately hereinafter described.

For the purpose of lifting the stream of glass from the shear blades 23a, roller 3 is carried by a yoke 27, pivoted on a fixed shaft 28, mounted in the standards 13. Rearwardly yoke 27 carries a counterweight 29. Yoke 27 carries a rearwardly declining plane 30, which contacts a castor 31, carried by the reciprocating actuating elements 24 for the shear knives. As the operating connections for the shear blades are retracted, castor 31 acting upon the plane 30 lifts roller 3 by swinging yoke 27 on its pivot. This action tends to lift the stream of glass from the shear blades, since the glass is sufficiently viscous to follow the movement of the roller. Upon forward movement of the operating connections for the shear blades, the castor 31 on these connections moves out of contact with the plane 30, and permits roller 3 to swing into its lower position. Although the intervals between the severance of mold charges are very short, they give an interval of time in which circulating fluid or other cooling means are enabled effectively to act on the shears to lower the temperature of the shear blades.

Upward movement of the lower roller 3 performs another function in that it tends regionally to thicken and shorten that portion of the stream of glass which is immediately to be severed by the shears, and thus in measure pre-shapes the mold charge immediately before it is received by the mold. Simply by adjusting the height of the slidably mounted post 32 which carries the plane-contacting castor 31, the distance which the roller 3 moves toward and away from the shear blades may be regulated. It will also be noted that both the rollers 2 and 3 have circular grooves 33 in which the stream of glass is contacted and deflected by the rollers as they rotate. By using grooves of selected contour the stream of glass may in measure be shaped to give mold charges of preferred shape for forming into glass articles of particular final contour.

It should be understood that the rollers 2 and 3, having the same direction of rotation which is tangentially in the direction of movement of the stream of glass, and the roller 3 being horizontally offset toward the stream with respect to the roller 2, the effect of the rollers on the glass is supportingly to contact the stream and not to work or forcibly to form it. The effect of the rollers on the stream of molten glass, aside from their effect as the poles of an electrical circuit, is, therefore, so to support and deflect the stream of molten glass that its form is preserved in passage to the shear blades, so that it does not tend to string-out or goose-neck in passage, but on the contrary is directed toward the mold in the form of a stream having a cross-sectional contour suitable for shearing into mold charges.

Aside from the heating effect which I obtain by passing the electrical current through that portion of the stream of glass which is between its points of contact with the rollers 2 and 3, the primary function of the rollers is thus not forcibly to shape the stream, but is primarily to preserve the normal thickness of the stream and properly to direct its flow. Because the rollers are rotated in the same direction and tangentially in the direction of stream-flow, and are continuously rotating during their short length of contact with the stream, they do not tend substantially to lower the temperature of the glass as they contact it, differing thus widely from organizations in which a stream of molten glass is pressed between two oppositely rotated rollers. As noted, some shaping may be effected in the grooves of the rollers and a thickening effect of the stream in its region of contact with the lower roller is obtainable by the timed upward movement of the lower roller.

Because the rollers tend to preserve the form of the flowing stream and in measure to thicken it, it is possible to operate with outflow glass of particularly high temperature, thus obtaining free flow of the glass and delivering it to the molds at a temperature which is optimum for its formation into glass articles.

If the general organization of the furnace and the forming machine to which mold charges are delivered from the furnace is such that the rollers may be positioned close to the furnace and the molds close to the lower roller, it is frequently possible to operate the rolls without using an electrical current, provided that the composition of the glass is consistent with its delivery from the furnace at particularly high temperature, and that such high temperature of delivery be employed. I am able in this manner to operate my feeder organization without the use of an electrical current, if the glass as delivered from the furnace has a temperature as high as about 1900° F.

Conversely by heating that portion of the stream of glass which lies between the rollers by passing an electrical current through it, I am able to use a lower temperature of outflow from the furnace and yet deliver mold charges to the molds at a temperature suitable for forming.

I have shown and described the use and provision of two rollers in both the method and apparatus embodiment of my invention. It is to be understood, however, that three or more rollers may be used where the relations between the furnace and the forming machine are such that the length of the stream of glass is greater. In such case the current path through the glass desirably is limited to that portion of the glass stream between the lowest roller and the roller next above, the other roller or rollers being non-conductive.

Having described an exemplary method and exemplary apparatus embodiment of my invention, it will be understood that procedure under the method, and the construction and arrangement of the apparatus, may be altered without departing from the spirit and scope of my invention, which I do not intend to limit either to the method or the apparatus embodiment thereof as herein disclosed, save as it may be restricted by the claims appended hereto.

I claim as my invention:

1. The herein disclosed method of feeding outflow glass from a glass-melting furnace in mold charges to receiving molds by supportingly and deflectingly contacting a stream of molten glass flowing from the furnace with a plurality of vertically spaced and horizontally offset rollers rotating in the same angular direction and in the direction of stream-flow, and severing mold charges of glass from the stream below the lowest of the said rollers.

2. The herein disclosed method of feeding outflow glass from a glass-melting furnace in mold charges to receiving molds by supportingly and deflectingly contacting a stream of glass flowing from the furnace with vertically spaced and horizontally offset rollers rotating in the same angular direction and in the direction of stream-flow, severing mold charges of glass from the said stream by an instrumentality positioned below the lowest of the said rollers, and intermittently lifting the stream of glass from the severing instrumentality by upward movement of the said lowest roller.

3. The herein disclosed method of feeding outflow glass from a glass-melting furnace in mold charges to receiving molds by supportingly and deflectingly contacting a stream of glass flowing from the furnace with vertically spaced and horizontally offset rollers rotating in the same angular direction and in the direction of stream-flow, severing mold charges of glass from the said stream by an instrumentality positioned below the lowest of the said rollers, intermittently lifting the stream of glass from the severing instrumentality by upward movement of the said lowest roller, and heating a portion of the said stream above its point of severance by passing an electrical current between the said lowest roller and the roller next above.

4. The herein disclosed method of feeding outflow glass from a glass-melting furnace in mold charges to receiving molds by supportingly and deflectingly contacting a stream of glass flowing from the furnace with a plurality of vertically spaced and horizontally offset rollers rotating in the same angular direction and in the direction of stream-flow, severing mold charges from the said stream below the lowest of the said rollers, and exerting on the said stream adjacent its point of severance an upwardly directed force tending regionally to thicken the stream by intermittent upward movement of the said lowest roller.

5. The herein disclosed method of feeding outflow glass from a glass-melting furnace in mold charges to receiving molds by supportingly and deflectingly contacting a stream of glass flowing from the furnace with a plurality of vertically spaced and horizontally offset rollers rotating in the same angular direction and in the direction of stream-flow, severing mold charges from the said stream below the lowest of said rollers, exerting on the said stream adjacent its point of severance an upwardly directed force tending regionally to thicken the stream by intermittent upward movement of the said lowest roller, and heating a portion of the said stream above its point of severance by passing an electrical current between the said lowest roller and the roller next above.

6. The herein disclosed method of feeding outflow glass from a glass-melting furnace in mold charges to receiving molds by subjecting the outflowing stream of glass to the intermittent stream-severing activity of a cutting instrumentality, heating a portion of the stream close to the point of its severance by passing an electrical current therethrough, and in the intervals between the glass-severing activity of the said cutting instrumentality exerting on the heated portion of the said stream an upwardly directed mechanical force tending to lift the stream from the cutting instrumentality and regionally to thicken the stream.

7. The herein disclosed method of feeding outflow glass from a glass-melting furnace in mold charges to receiving molds by subjecting a stream of molten glass flowing from the furnace to supporting and deflecting contact exerted against a single side of the stream by a plurality of vertically spaced and horizontally offset rollers rotating in the same angular direction and in the direction of flow of the stream, severing mold charges from the stream of glass below the lowest of the said rollers, and intermitting flow of the stream of glass adjacent the point of severing in the intervals between severance of mold charges.

HUGH S. BRADY.